(12) United States Patent
Verret

(10) Patent No.: US 7,297,662 B2
(45) Date of Patent: Nov. 20, 2007

(54) METHOD AND COMPOSITION FOR INHIBITING LOST CIRCULATION DURING WELL OPERATION

(75) Inventor: Robin J. Verret, Youngsville, LA (US)

(73) Assignee: Turbo-Chem International, Inc., Scott, LA (US)

( * ) Notice: Subject to any disclaimer, the term of this patent is extended or adjusted under 35 U.S.C. 154(b) by 73 days.

(21) Appl. No.: 10/905,983

(22) Filed: Jan. 28, 2005

(65) Prior Publication Data

US 2005/0170973 A1 Aug. 4, 2005

Related U.S. Application Data

(60) Provisional application No. 60/481,966, filed on Jan. 29, 2004.

(51) Int. Cl.
*C09K 8/36* (2006.01)
*E21B 43/22* (2006.01)

(52) U.S. Cl. ............ 507/107; 507/137; 507/139; 507/140; 166/282

(58) Field of Classification Search ............ 507/107
See application file for complete search history.

(56) References Cited

U.S. PATENT DOCUMENTS

| | | | | |
|---|---|---|---|---|
| 2,718,498 A * | 9/1955 | Salathiel | .................... | 507/117 |
| 2,912,380 A * | 11/1959 | Groves | .................... | 507/112 |
| 3,496,902 A * | 2/1970 | Kern et al. | .................... | 175/72 |
| 3,659,651 A * | 5/1972 | Graham | .................... | 166/280.2 |
| 3,701,384 A | 10/1972 | Routson et al. | .................... | 166/292 |
| 3,956,140 A * | 5/1976 | Nahm et al. | .................... | 507/117 |
| 4,460,052 A | 7/1984 | Gockel | .................... | 175/72 |
| 4,498,995 A | 2/1985 | Gockel | .................... | 252/8.5 LC |
| 4,531,594 A * | 7/1985 | Cowan | .................... | 175/72 |
| 4,671,883 A | 6/1987 | Connell et al. | .................... | 252/8.515 LC |
| 4,683,949 A | 8/1987 | Sydansk et al. | .................... | 166/270 |
| 4,744,419 A | 5/1988 | Sydansk et al. | .................... | 166/270 |
| 5,004,553 A | 4/1991 | House et al. | .................... | 252/8.51 |
| 5,631,313 A | 5/1997 | Bishop et al. | .................... | 524/45 |
| 5,673,753 A | 10/1997 | Hale et al. | .................... | 166/293 |
| 5,925,182 A | 7/1999 | Patel et al. | .................... | 106/266 |
| 6,013,879 A | 1/2000 | Nakamura et al. | .................... | 175/72 |
| 6,016,879 A * | 1/2000 | Burts, Jr. | .................... | 175/72 |
| 6,030,928 A * | 2/2000 | Stahl et al. | .................... | 507/121 |
| 6,508,306 B1 | 1/2003 | Reddy et al. | .................... | 166/295 |
| 6,561,273 B2 | 5/2003 | Brothers et al. | .................... | 166/294 |
| 6,675,895 B1 | 1/2004 | Shehab et al. | .................... | 166/292 |
| 6,702,044 B2 * | 3/2004 | Reddy et al. | .................... | 175/64 |

* cited by examiner

*Primary Examiner*—Randy Gulakowski
*Assistant Examiner*—John J. Figueroa
(74) *Attorney, Agent, or Firm*—Daniel N. Lundeen; Lundeen & Dickinson, LLP

(57) ABSTRACT

A method and drilling fluid additive composition are provided for reducing lost circulation and seepage loss when synthetic or oil based drilling fluid is used. The method includes injecting drilling fluid and 1 to 50 pounds per barrel of a loss control additive having a composition comprising 20 to 80 parts by weight fibrous particles, 10 to 40 parts by weight lignite, and 10 to 40 parts by weight phenol-formaldehyde resin.

28 Claims, 1 Drawing Sheet

METHOD AND COMPOSITION FOR INHIBITING LOST CIRCULATION DURING WELL OPERATION

CROSS REFERENCE TO RELATED APPLICATION

This application claims priority to U.S. Provisional Application Ser. No. 60/481,966 filed in the United States Patent and Trademark Office on Jan. 29, 2004.

BACKGROUND

A new method and composition designed to eliminate problems associated with seepage loss and lost circulation of synthetic and oil based drilling fluids during drilling operations. More particularly, the method involves injecting a mixture into the well bore and the lost circulation zone, and the mixture forming a barrier within the well bore to prevent further loss of fluids.

Drilling fluids, or drilling muds as they are often known, are generally slurries of clay solids or polymers used in the drilling of wells in the earth for the purpose of recovering hydrocarbons and other fluid materials. Typically, a drilling mud is circulated down through the drill pipe, out the drill bit, and back to the surface through the annulus between the drill pipe and the borehole wall. Drilling fluids generally may include one or more of the following materials: viscosifiers or suspending agents, weighting agents, corrosion inhibitors, soluble salts, seepage loss control additives, bridging agents, emulsifiers, lubricants and other additives as desired.

Oil-based drilling fluids can be comprised of oils, including for example, diesel, poly alpha olefins, mineral oils, propylene glycol, methyl glycoside, modified esters and ethers, and the like and mixtures thereof, and invert emulsions of oil in which water is dispersed in an oil-based mediuim Oil based drilling fluids can be comprised entirely of oil, or more commonly, may contain water ranging in concentration from 50% up to 50%. In such a mixed oil and water system, water becomes the internal phase and is emulsified into the oil, i.e., oil becomes the external phase.

Drilling fluids can have a number of functions, including but not limited to, lubricating the drilling tool and drill pipe which carries the tool, providing a medium for removing formation cuttings from the well, counterbalancing formation pressures to prevent the inflow of gas, oil or water from permeable or porous formations which may be encountered at various levels as drilling continues, preventing the loss of drilling fluids into permeable or porous formations, and holding the drill cuttings in suspension in the event of a shutdown in the drilling and pumping of the drilling mud. Drilling fluid additives can form thin, low permeability filter cake that can seal openings in formation penetrated by the bit and act to reduce the unwanted influx of fluids and loss of the drilling fluids to permeable formation. The filter cake forms when the drilling fluid contains particles that are approximately the same size as the pore openings in the formation being drilled.

For a drilling fluid to perform the desired functions and allow drilling activities to continue, the drilling fluid must remain in the borehole. Frequently, undesirable formation conditions are encountered in which substantial amounts, or in some cases, practically all of the drilling fluid may be lost to the formation. Drilling fluid can leave the borehole through large or small fissures, or fractures in the formation or through a highly porous rock matrix surrounding the matrix.

Because fluid loss is a common occurrence in drilling operations, drilling fluids are typically formulated to intentionally seal porous formation during drilling in order to stabilize the borehole and control fluid loss. However, formations are frequently encountered that are so porous as to increase the loss of drilling fluids beyond an acceptable limit despite the use of traditional lost circulation additives. In extreme situations, when the borehole penetrates a fracture in the formation through which most of the drilling fluid may be lost, drilling operations may be stopped until the loss circulation zone is sealed and fluid loss to the fracture is reduced.

U.S. Pat. No. 3,701,384 Routson et al. discloses a method of sealing permeable areas in a formation by plugging the pores with a solid material. A slurry of finely divided inorganic solids is injected into the formation together with an aqueous colloidal dispersion of a water-insoluble metal hydroxide in dilute aqueous solution of an organic polymeric polyelectrolyte, preferably containing a high molecular weight polyacrylamide or hydrolyzed polyacrylamide. At low concentrations, between 0.01 and 0.2 percent by weight, the dissolved polymer causes the suspended solids to flocculate, thereby blocking pores in the formation. The tested inorganic solids included finely ground asbestos fibers and magnesium oxide. However, due to its carcinogenic nature, asbestos is undesirable for widespread commercial use.

U.S. Pat. Nos. 4,683,949 and 4,744,419 to Sydansk et al. disclose a method for sealing permeable areas in formations using polymers cross-linked in-situ. Both patents note that effective polymer/cross-linking agents must be supplied sequentially with great care to prevent the cross-linked polymer from setting up too early.

Various formation agents and additives are known in the art to form formation seals and/or filter cakes on the wall of a well bore. These include sugar cane fibers or bagasse, flax, straw, ground hemp, cellophane strips, ground plastics, ground rubber, mica flakes, expanded perlite, silica slag, ground fir bark, ground redwood bark and fibers, grape extraction residue, cottonseed hulls, cotton balls, ginned cotton fibers, cotton linters, and the like.

Generally, the use of cellulose fibers has been for control of seepage loss or lost circulation and differential sticking, rather than for the stabilization of shale formations. To prevent further seepage loss, a number of different cellulose materials have been added to drilling fluids in the prior art in an effort to reduce the permeability of the formation being drilled. Such prior known cellulose fiber materials can include fibrous, flake, and granular ground forms, and combinations thereof. Representative of such cellulose fibers include nut and seed shells or hulls, such as, for example, pecan, almond, walnut, peach, brazil, coconut, peanut, sunflower, flax, cocoa bean, cottonseed, rice, linseed, oat, and the like. See for example, House, et al., U.S. Pat. No. 5,004,553; Borchardt, U.S. Pat. No. 2,799,647; and Gockel, U.S. Pat. Nos. 4,460,052 and 4,498,995.

Of particular interest is the development of improved methods for preventing or minimizing loss of oil based or synthetic drilling fluids when low pressure formations are encountered in drilling operations or due to seepage in porous formations. While materials for the prevention of loss via seepage and circulation loss are well known for water based drilling muds, loss control additives for synthetic or oil based muds are particularly desirable due to the high costs associated with these replacement of these drilling fluids.

SUMMARY OF THE INVENTION

A composition and method for reducing lost circulation and seepage loss of drilling fluids in drilling operations is provided. In one embodiment of the present invention, a drilling fluid for reducing circulation loss is provided comprising a liquid carrier, and a mixture of lignite, phenol-formaldehyde resin solids, and fibrous particles, wherein the liquid carrier is an oil based or synthetic drilling mud and the mixture is added to the liquid carrier at a concentration of between 1 and 50 pounds per barrel of liquid carrier, said mixture comprising between 15 and 35 parts by weight lignite, between 15 and 35 parts by weight phenol-formaldehyde resin solids, and between 35 and 65 parts by weight fibrous particles. The mixture can comprise between 20 and 30 parts by weight lignite, between 20 and 30 parts by weight phenol formaldehyde resin solids, and between 40 and 60 parts by weight fibrous particles. The mixture can comprise between 22 and 28 parts by weight lignite, between 22 and 28 parts by weight phenol-formaldehyde resin solids, and between 45 and 55 parts by weight fibrous particles. The mixture can be added at a concentration of between 5 and 20 pounds per barrel of drilling fluid.

In another embodiment of the present invention, a lost circulation drilling fluid additive for use with synthetic or oil based drilling fluids is provided, comprising 20 to 80 parts by weight fibrous particles, 10 to 40 parts by weight lignite, and 10 to 40 parts by weight phenol-formaldehyde resin solids. The drilling fluid additive can comprise 40 to 60 parts by weight fibrous particles, 20 to 30 parts by weight lignite, and 20 to 30 parts by weight phenol-formaldehyde resin solids. The drilling fluid additive can comprise 45 to 55 parts by weight fibrous particles, 22 to 28 parts by weight lignite, and 22 to 28 parts by weight phenol-formaldehyde resin solids. The additive can have a particle size distribution wherein at least 50 percent by number have a diameter of less than 125 microns and at least 75 percent by numbers have a diameter of less than 250 microns. The phenol-formaldehyde resin solids can be chemically inert.

In another embodiment of the present invention, a method for drilling a subterranean well is provided, comprising the steps of: (a) cutting a borehole into the earth using a drill string; and (b) circulating a synthetic or oil based drilling fluid into drill string wherein the drilling fluid can comprise 20 to 80 parts by weight fibrous material, 10 to 40 parts by weight lignite, and 10 to 40 parts by weight phenol-formaldehyde resin solids. The additive can be added at a concentration of between 1 and 30 pounds per barrel of drilling fluid. The additive can be added at a concentration of between 5 and 15 pounds per barrel of drilling fluid.

In another embodiment, a method for substantially inhibiting fluid loss in subterranean drilling operations is provided, comprising: (a) preparing a drilling fluid additive comprising phenol-formaldehyde, lignite and a fibrous particulate material; (b) mixing the additive into a drilling fluid at a concentration between 1 and 50 pounds per barrel of drilling fluid; and (c) circulating the drilling fluid and additive mixture through a drill string and into the well bore. The additive can comprise between 15 and 35 parts by weight lignite, between 15 and 35 parts by weight phenol-formaldehyde resin, and between 30 and 70 parts by weight fibrous particles. The additive can comprise between 20 and 30 parts by weight lignite, between 20 and 30 parts by weight phenol-formaldehyde resin, and between 40 and 60 parts by weight fibrous particles. The phenol-formaldehyde resin can be chemically inert. The additive can be mixed into the drilling fluid at a concentration of between 5 and 20 pounds per barrel of drilling fluid.

DETAILED DESCRIPTION OF THE INVENTION

Figure 1:
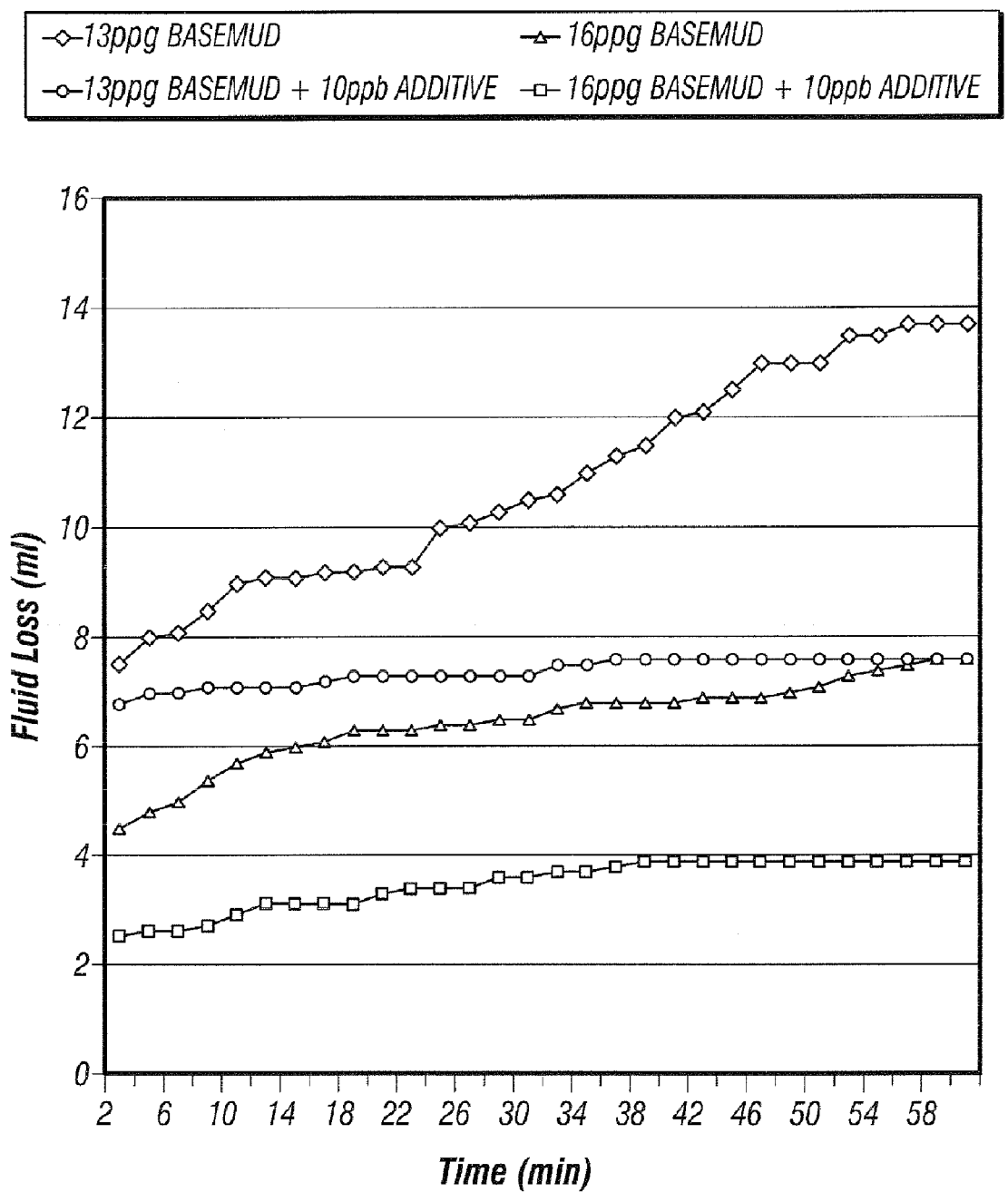
FIG. 1 is a graph showing performance of drilling fluids with additive versus drilling fluids without additive.

The present invention is directed toward a method and composition designed to decrease or eliminate seepage loss and lost circulation in a drilling operation employing synthetic or oil based drilling fluids. The invention can be supplied as a general additive to the drilling fluid, or may be supplied to a well bore in high concentrations as needed when excessive seepage or circulation loss problems are encountered during drilling.

The present invention comprises a mixture of materials not previously used in oil based or synthetic drilling fluid systems, including without limitation mineral oils and diesel based drilling fluids. The loss prevention additive comprises a condensation polymer, lignite, and a source of fibrous particles. Preferably, the condensation polymer can be the fully reacted and chemically inert product of the condensation of phenols or substituted phenols with aldehydes, such as, for example, formaldehyde, acetaldehyde or furfural. More preferably, the condensation polymer is a solid polymer resin such as phenol-formaldehyde resin. The end result is a truly synergistic effect as the combination of the materials provides superior results in the form of improved loss reduction properties, improved filter cake development, and enhanced lubrication properties, including the reduction of friction thereby enhancing rotary and motor drilling as well as logging and casing runs. In addition, the composition can be used in the sealing of low pressure sands, the stabilization of shale sections, and the reduction of differential sticking tendencies in low pressure sands. This result is rather startling in view of the observation that phenol-formaldehyde resin by itself, when mixed with synthetic or oil based drilling fluids, yields poorer results than the mud by itself.

The loss control additive of the present invention can be a powdered additive designed for use in mineral oil, invert, diesel and synthetic based drilling fluids, and can also be used in coring fluids and oil based workover and completion fluids. It can be added to drilling fluid systems consisting of 100% oil or synthetic fluids, or to mixed oil/water systems. The additive of the present invention can be supplied to the drilling fluids at low concentrations for routine use during normal drilling operations. When necessary, the additive can be mixed into the drilling fluids in larger concentrations for pill applications, as needed to prevent further circulation loss or seepage if the drill bit hits a formation causing a drop in pressure and loss of drilling fluid. Generally, the composition can be supplied as an additive to synthetic and oil based drilling fluids in concentrations from 1 to 20 ppb (pounds per barrel of drilling fluid), depending on the formation conditions. When used in spot or pill applications, as a measure to prevent further loss due to unexpected seepage, or in an effort to seal micro-fractured formations, concentrations of between 10 and 50 ppb can be employed.

Hydrophobic synthetic fibrous particles suitable to prevent seepage and circulation loss in the present system can include, but are not limited to, nylon, rayon, polyolefin fibers and combinations thereof.

Comminuted particles of plant materials suitable for use in preventing seepage and circulation loss in the present invention can include, but are not limited to, any particles derived from nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; shredded paper; ground hemp; paper pulp; cellophane strips; ground bark; bagasse; bamboo; corn stalks; various tree portions including sawdust, wood or bark; straw; cork; dehydrated vegetable matter; whole ground corn cobs; or various plant portions of the corn cob light density pith core, the corn cob ground woody ring portion, the corn cob coarse or fine chaff portion, cotton seed stem, flax stems, wheat stems, sunflower seed stems, soybean stems, maize stems, rye grass stems, millet stem, and the like, and various mixtures of these materials.

Drilling fluids generally can contain known weight materials, including but not limited to barite, barium sulfate, and the like. The weight materials generally function to increase the density of the drilling fluid. To prevent blowout and the uncontrolled flow of fluids from the formation into the well, the drilling fluid should have a density effective to provide a greater pressure than that exerted by the formation fluids. However, the density must not be too high, because excessive hydrostatic pressures can cause further loss of circulation.

Drilling fluids can contain gelling agents, such as for example, starch or derivatized starches. Any suitable granular starch or mixture of starches may be used in the present invention. Accordingly, as used herein, the term "starch" is understood to include one or more natural starches, one or more chemically modified starches, and mixtures of one or more natural and/or chemically modified starches. Natural starches that may be employed in the invention include, but are not limited to, those of potato, wheat, tapioca, rice, corn, roots having a high starch content, and the like. Waxy starches, such as for example, waxy cornstarch, is often preferred as a gelling agent. Chemically modified starches can be those derived from natural starches by chemical reaction of the natural starch with a suitable organic reactant. Chemically modified starches which may be used in the invention can include, but are not limited to, carboxymethyl starch, hydroxyethyl starch, hydoxypropyl starch, acetate starch, sulfamate starch, phosphate starch, nitrogen modified starch, starch cross-linked with aldehydes, epichlorohydrin, borates, and phosphates, and mixtures thereof. Various starches are disclosed in U.S. Pat. Nos. 4,652,384; 4,822,500; 4,422,947; 4,123,366; 5,804,535; 5,851,959; and 5,948,733.

The loss control additive can be used to seal microfractured shale, chalk, carbonate, and coal formations encountered during drilling operations, thereby preventing further loss of the synthetic or oil based drilling fluid. A mixture suitable as an LCM (loss circulation material) can be prepared by mixing a pre-packaged fibrous material comprising, for example, PREMIUM SEAL® Fine (hereinafter "PSF") with lignite and phenol-formaldehyde resin. PSF is a deformable and compressible micronized cellulose fiber which is compatible for use with oil-based and synthetic muds, and has been specially designed to seal permeable formations, although other sources of fibrous materials may also be used advantageously in the present invention. The optimum particle size distribution (PSD) of graded fibrous particles in the PSF material helps to create a bridging action within a fraction of an inch in the borehole and a matting effect within the mud wall cake. Similar materials, such as for example, PREMIUM SEAL® Coarse (hereinafter "PSC"), or mixtures of the PSF and PSC, can also be used in the present system. Mixtures of PSF with lignite and phenol-formaldehyde resin have shown good results for preventing loss circulation and seepage in wells.

The loss control mixture can comprise between 20 to 80 parts by weight fibrous particles, from 10 to 40 parts by weight lignite, and from 10 to 40 parts by weight phenol-formaldehyde resin solids. Preferably, the loss control mixture comprises from 35 to 65 parts by weight fibrous particles, from 15 to 35 parts by weight lignite, and from 15 to 35 parts by weight phenol-formaldehyde resin solids. More preferably, the loss control mixture comprises from 45 to 55 parts by weight of fibrous particles, from 22 to 28 parts by weight lignite, and from 22 to 28 parts by weight phenol-formaldehyde resin solids. Preferably, the fibrous material is either PSF or PSC blended cellulose particles, or a mixture thereof. The fluid loss additive can have a compacted density of between 560 and 880 $kg/m^3$ (35 and 55 $lb/ft^3$), preferably between 640 and 800 $kg/m^3$ (40 and 50 $lb/ft^3$).

Phenol-formaldehyde resin solids are generally not marketed for use with synthetic or oil based drilling fluid systems. In fact, phenol-formaldehyde resins generally can be used as a fluid loss control additive in saturated salt water based drilling muds. Whereas loss control additives are frequently reacted in-situ to form an integrated seal with the other additives, the present invention employs a fully reacted phenol-formaldehyde resin. Thus, the solid phenol-formaldehyde resins are chemically inert, having previously undergone polymerization reactions.

The loss control additive can be pre-blended for ease of application in drilling applications. In preventing seepage and lost circulation during drilling operations, mud formulation companies commonly recommend from 40 to 50 ppb (pound per barrel) of additives. In preparation of the mud mixtures, it is common for a rig hand to be required to mix between 5 and 10 different products in forming the loss control material. The present invention can be added at lower concentrations, preferably of between 5 and 20 ppb, and can be pre-blended and available in 25 pound bags for ease of application on the drilling rig. Rig safety can thus be increased and response time dramatically cut by reducing the need to mix multiple products, or to measure and add multiple products to the drilling fluids. In addition, the likelihood of obtaining the proper concentration and composition of the loss control additive can be increased.

In the present invention, it is preferred that the loss control additive is added to synthetic or oil based drilling fluid in the absence of any acidic mediuim The phenol formaldehyde, lignite and PSF remain as suspended solids in sealing porous locations in the formation. The resin solids are insoluble or slightly soluble in synthetic or oil based drilling fluids comprising a continuous oil phase wherein any aqueous phase is internal, i.e. an invert emulsion of oil. In water based systems, the phenol-formaldehyde resin exhibits some greater solubility than in the oil-based or synthetic drilling fluids, thus decreasing the availability of phenol-formaldehyde resin particles for preventing seepage, lost circulation and function as a component to the filter cake.

Whereas polymers used in drilling fluids frequently undergo reactions in-situ in an effort to intimately combine the polymers with the other additives in the formation of the filter cake, the phenol-formaldehyde resin of the present invention is preferably added in fully reacted, solid form. The addition of the fully reacted polymer resin eliminates the often difficult task of mixing polymer reagents to achieve a desired reaction time or product. In addition, reproducibility of the polymerization can be difficult.

Particle size distribution in the loss control additive composition of the present invention can be between 1 micron and 2 mm, preferably between 10 microns and 1 mm. Preferably, 50% by number of the particles are less than 125 microns, 70% by number of the particles are less than 250 microns and 90% by number of the particles are less than 600 microns in size. The size of the passages through the circulating jets in the drill bit is the absolute maximum particle size of the additives. However, the particles of the loss control additive composition should be of a small enough size so as to be able to enter the formation through fissures, small fractures and large pores. Generally, particles should be sized according to the properties of the formation and the lost circulation zone.

It is believed that in the present invention, during formation of the filter cake, the phenol-formaldehyde resin solids change in size (i.e. swell), while the cellulose fibers change shape, resulting in a variable particle size distribution. This phenomenon is believed to result in more efficient packing of the filter cake, resulting in a more stable and less porous filter cake. Whereas filter cakes typically undergo a dynamic process of erosion and rebuilding during the cycling of the drilling mud through a wellbore, it is believed that the loss control additive of the present invention exhibits greater stability, thus reducing erosion as compared with prior art drilling fluid additives.

EXAMPLE 1

Simulated tests were conducted on an Ofite Dynamic High Pressure High Temperature apparatus (DHPHT). The apparatus is designed to simulate conditions present within the well. The apparatus is a stainless steel pipe having an inside diameter of 5.7 cm (2.25 in.), a volume of 500 mL, and is capped at each end. The apparatus is equipped with an impeller which causes the mud to flow in a pattern that simulates the use of drilling fluid within the drill pipe (i.e. the fluid flows down the center of the test apparatus and returns along the walls of the test apparatus. On one end of the testing apparatus is a porous disk from which seepage measurements are taken. Measurements are taken at an initial starting point, and then at 2 minute intervals for a total of 60 minutes. The test is designed to demonstrate the ability of a given material to prevent seepage and loss circulation, as well as predicting the ability of the material to form a stable filter cake in the well bore. The tests were conducted at 0.88 MPa (500 psi) and 149° C. (300° F.), a volume of 350 mL, and an impeller rate of 300 rpm. Seepage was measured over a 60 micron disk.

Initial tests were conducted on drilling mud samples containing fibrous material and phenol-formaldehyde resin, which yielded results similar to those achieved for muds containing gilsonite material, which was highly desired. However, the high cost for the phenol-formaldehyde resins made it cost prohibitive to commercially produce a loss control additive with this formulation. Further testing revealed that substituting lignite for a portion of the phenol-formaldehyde resulted in a loss control additive formulation that exhibited superior properties at a cost basis reasonable for commercialization.

Tests were conducted using 13 ppg (pounds per gallon) Nova Plus Mud (having an oil/water ratio of 68/32 and containing 23% solids) and 16 ppg Nova Plus Mud (having an oil/water ratio of 73/27 and containing 35% solids) as reference materials. The loss control additive was tested in each of the drilling muds at a concentration of 10 ppb. Test samples containing the loss control additive had an oil/water ratio identical to that of the base muds being compared.

The Figure shows the results for the DHPHT test for a composition comprising 50% by weight PSF, 25% by weight lignite and 25% by weight phenol-formaldehyde resin. The results demonstrate the exceptional ability for this mixture to both prevent seepage and to form a good, stable filter cake.

Initial spurt measurements were lower for the tested material than the base material. The 13 ppg Nova Plus Base mud had an initial spurt of 5.5 mL, and a first measurement of 7.5 mL, compared with the initial measurement of the 10 ppb of the 50/25/25 mixture of the loss control additive and the 13 ppg Nova Plus Base mud having an initial spurt measurement of 3.0 mL and an initial measurement of 6.8 mL. The Nova base material continued to allow the passage of mud as evidenced by the graph where a total 13.7 mL of the drilling fluids were lost over the 1 hour testing period, as compared with the material mixed with the loss control additive which showed total seepage of 7.6 mL after 1 hour. Thus, after the initial spurt (as used herein, initial spurt refers to the fluid lost during the formation of the filter cake), the present invention material showed a loss of only 4.6 mL compared with the base material which lost 8.2 mL after the initial spurt. Similarly, the results of the 16 ppg Nova Plus Base show an initial spurt of 3.5 mL, an initial measurement of 4.5 mL and a 60 minute measurement of 7.6 mL (a loss of an additional 4.1 mL during the 60 minute experiment). The 16 ppg Nova Plus Base with an additional 10 ppb the loss additive material having an identical composition as noted above showed an initial spurt of 1.2 mL, an initial measurement of 2.5 mL, and a 60 minute measurement of 3.9 mL (corresponding to the loss of an additional 2.7 mL during the 60 minute testing period). Thus, the addition of the additive to the 13 ppg Nova Plus Base mud results in a reduction of fluid loss of 44% and the addition to the 16 ppg Nova Plus Base mud results in a reduction of fluid loss of 35%, as compared to the performance of the drilling mud by itself.

The addition of the loss control additive had little effect on the electrostatic and rheological properties of the base mud material. Compared with the base mud, the blended system at concentrations of 10 ppb (pounds per barrel) and 15 ppb of the loss circulation additive had little difference in properties, and in some cases, has improved properties over the base mud. For example, the plastic viscosity and yield point of the base mud, and the 10 ppb and 15 ppb systems were virtually unchanged, with plastic viscosity measurements of 8.9 cp (centipoise), 9.8 cp and 10.7 cp respectively and yield point measurements of 1.8 lb/100 sq ft, 1.4 lb/100 sq ft, and 1.5 lb/100 sq ft respectively. Similarly, electrical stability measurements of the materials were virtually unchanged and generally not affected by concentration of the loss control additive.

The addition of the loss control additive material of the present invention can also improve the flow properties of the material. Gel measurements, taken at 10 sec. and 10 min., were superior for the drilling fluids containing the loss control additive, as compared with the base mud. Normally, synthetic drilling fluids will have the same or a slightly higher gel measurement after 10 min. when compared with the 10 sec. measurement. In the blended system, the gel measurements decreased slightly at the 10 min. measurement. In some cases, depending on the base mud, the 10 minute gel measurement for the blended system was less than 50% of the 10 min. gel measurement for the base mud system. A decrease in the gel measurement is desirable, particularly in situations where the mud may be left static in the well for several hours while other related operations are carried out.

EXAMPLE 2

Tests were conducted using a 16 ppg mud having a synthetic/water ratio of approximately 73/27 and containing approximately 35% solids by volume. The loss control additive, having a composition of 50% by weight PSF, 25% by weight lignite, and 25% by weight fully reacted phenol-formaldehyde resin, was tested at a concentration of 10 pounds per barrel of drilling fluid. Tests were conducted 3.5 MPa (2000 psi) and a temperature of 93° C. (200° F.). Seepage was measured over a 150 micron disk.

Initial spurt measurements for the test sample were approximately 0 mL and a total fluid loss of approximately 0.8 mL. The base mud had an initial spurt measurement of approximately 24.4 mL and a total fluid loss of approximately 26.4 mL. Thus, fluid loss in the sample having the loss control additive was approximately 40% of that for the base mud.

The invention is described above in reference to specific examples and embodiments. The metes and bounds of the invention are not to be limited by the foregoing disclosure, which is illustrative only, but should be determined in accordance with the full scope and spirit of the appended claims. Various modifications will be apparent to those skilled in the art in view of the description and examples. It is intended that all such variations within the scope and spirit of the appended claims be embraced thereby.

What is claimed is:

1. A drilling fluid for reducing circulation loss consisting essentially of a liquid carrier, and a mixture of lignite, phenol-formaldehyde resin solids, and fibrous particles, wherein the liquid carrier is an oil based or synthetic drilling mud consisting essentially of a continuous oil phase, wherein any aqueous phase in the oil based or synthetic drilling mud is internal, and the mixture is added to the liquid carrier at a concentration of between 1 and 50 pounds per barrel of liquid carrier, said mixture comprising between 15 and 35 parts by weight lignite, between 15 and 35 parts by weight phenol-formaldehyde resin solids, and between 35 and 65 parts by weight fibrous particles.

2. The drilling fluid of claim 1, wherein the mixture comprises between 20 and 30 parts by weight lignite, between 20 and 30 parts by weight phenol-formaldehyde resin solids, and between 40 and 60 parts by weight fibrous particles.

3. The drilling fluid of claim 1, wherein the mixture comprises between 22 and 28 parts by weight lignite, between 22 and 28 parts by weight phenol-formaldehyde resin solids, and between 45 and 55 parts by weight fibrous particles.

4. The drilling fluid of claim 1 wherein the mixture is added at a concentration of between 5 and 20 pounds per barrel of drilling fluid.

5. The drilling fluid of claim 2 wherein the mixture is added at a concentration of between 5 and 20 pounds per barrel of drilling fluid.

6. A method for drilling a subterranean well comprising the steps of:
cutting a borehole into the earth using a drill string; and
circulating a synthetic or oil based drilling fluid into the drill string wherein the drilling fluid consists essentially of a liquid carrier, and an additive of lignite, phenol-formaldehyde resin solids, and fibrous particles, wherein the liquid carrier is an oil based or synthetic drilling mud consisting essentially of a continuous oil phase wherein any aqueous phase is internal, and the mixture is added to the liquid carrier at a concentration of between 1 and 50 pounds per barrel of liquid carrier, said mixture comprising between 15 and 35 parts by weight lignite, between 15 and 35 parts by weight phenol-formaldehyde resin solids, and between 35 and 65 parts by weight fibrous particles.

7. The method of claim 6, wherein the additive is added to the drilling fluid at a concentration of between 1 and 30 pounds per barrel of drilling fluid.

8. The method of claim 6, wherein the additive is added to the drilling fluid at a concentration of between 5 and 15 pounds per barrel of drilling fluid.

9. A method for substantially inhibiting fluid loss in subterranean drilling operations comprising:
mixing an additive, into an oil based or synthetic drilling fluid consisting essentially of a continuous oil phase wherein any aqueous phase in the oil based or synthetic drilling mud is internal, at a concentration between 1 and 50 pounds of the additive per barrel of drilling fluid to form an additive-drilling fluid mixture, wherein the additive comprises phenol-formaldehyde resin solids, lignite and a fibrous particulate material, wherein the resin solids are capable of swelling in the drilling fluid; and
circulating the additive-drilling fluid mixture through a drill string and into a well bore.

10. The method of claim 9 wherein the additive comprises between 15 and 35 parts by weight lignite, between 15 and 35 parts by weight phenol-formaldehyde resin, and between 30 and 70 parts by weight fibrous particles.

11. The method of claim 9 wherein the additive comprises between 20 and 30 parts by weight lignite, between 20 and 30 parts by weight phenol-formaldehyde resin, and between 35 and 65 parts by weight fibrous particles.

12. The method of claim 9 wherein the phenol-formaldehyde resin is chemically inert.

13. The method of claim 11 wherein the additive is mixed into the drilling fluid at a concentration of between 5 and 20 pounds per barrel of drilling fluid.

14. The method of claim 13 wherein the phenol-formaldehyde resin is chemically inert.

15. The drilling fluid of claim 1, wherein the resin solids are insoluble or slightly soluble in the liquid carrier.

16. The drilling fluid of claim 1, wherein the resin solids are capable of swelling in the liquid carrier.

17. The method of claim 9, wherein the resin solids are insoluble or slightly soluble in the additive-drilling fluid mixture.

18. The drilling fluid of claim 15, wherein the resin solids are capable of swelling in the liquid carrier.

19. The drilling fluid of claim 1, wherein the oil based or synthetic drilling mud comprises from 5 to 50 percent water by volume.

20. The method of claim 9, wherein the oil based or synthetic drilling fluid comprises from 5 to 50 percent water by volume.

21. The drilling fluid of claim 1, wherein the resin solids are insoluble in the liquid carrier.

22. The drilling fluid of claim 21, wherein the resin solids are capable of swelling in the liquid carrier.

23. The method of claim 9, wherein the resin solids are insoluble in the additive-drilling fluid mixture.

24. A drilling fluid for reducing circulation loss consisting essentially of a liquid carrier, and a mixture of lignite, phenol-formaldehyde resin solids, and fibrous particles, wherein:
   the liquid carrier is an oil based or synthetic drilling mud consisting essentially of an invert oil emulsion;
   the mixture is added to the liquid carrier at a concentration of between 1 and 50 pounds per barrel of liquid carrier;
   the mixture comprises between 15 and 35 parts by weight lignite, between 15 and 35 parts by weight phenol-formaldehyde resin solids, and between 35 and 65 parts by weight fibrous particles;
   the resin solids are capable of swelling in the liquid carrier; and
   the resin solids are insoluble in the liquid carrier.

25. The drilling fluid of claim 24, wherein the liquid carrier further consists essentially of from 5 to 50 percent water by volume.

26. A method for drilling a subterranean well comprising the steps of:
   cutting a borehole into the earth using a drill string; and
   circulating a synthetic or oil based drilling fluid into the drill string wherein the drilling fluid consists essentially of a drilling fluid additive comprising 20 to 80 parts by weight fibrous particles, 10 to 40 parts by weight lignite, and 10 to 40 parts by weight phenol-formaldehyde resin solids wherein the resin solids are insoluble and capable of swelling in the synthetic or oil based drilling fluid, wherein the resin solids are insoluble or slightly soluble in water, and wherein an oil phase is external and any aqueous phase in the drilling fluid is internal.

27. A method for substantially inhibiting fluid loss in subterranean drilling operations comprising:
   mixing an additive, into an oil based or synthetic drilling fluid consisting essentially of a liquid phase in the oil based or synthetic drilling fluid consisting essentially of oil or an invert oil emulsion comprising up to 50 volume percent water, at a concentration between 1 and 50 pounds of the additive per barrel of drilling fluid to form an additive-drilling fluid mixture, wherein the additive comprises phenol-formaldehyde resin solids, lignite and a fibrous particulate material, wherein the resin solids are capable of swelling in the drilling fluid and are insoluble in the drilling fluid; and
   circulating the additive-drilling fluid mixture through a drill string and into a well bore.

28. The method of claim 27, wherein the additive comprises 20 to 80 parts by weight fibrous particles, 10 to 40 parts by weight lignite, and 10 to 40 parts by weight phenol-formaldehyde resin solids wherein the resin solids are insoluble and capable of swelling in the synthetic or oil based drilling fluid.

* * * * *